Figure 1:
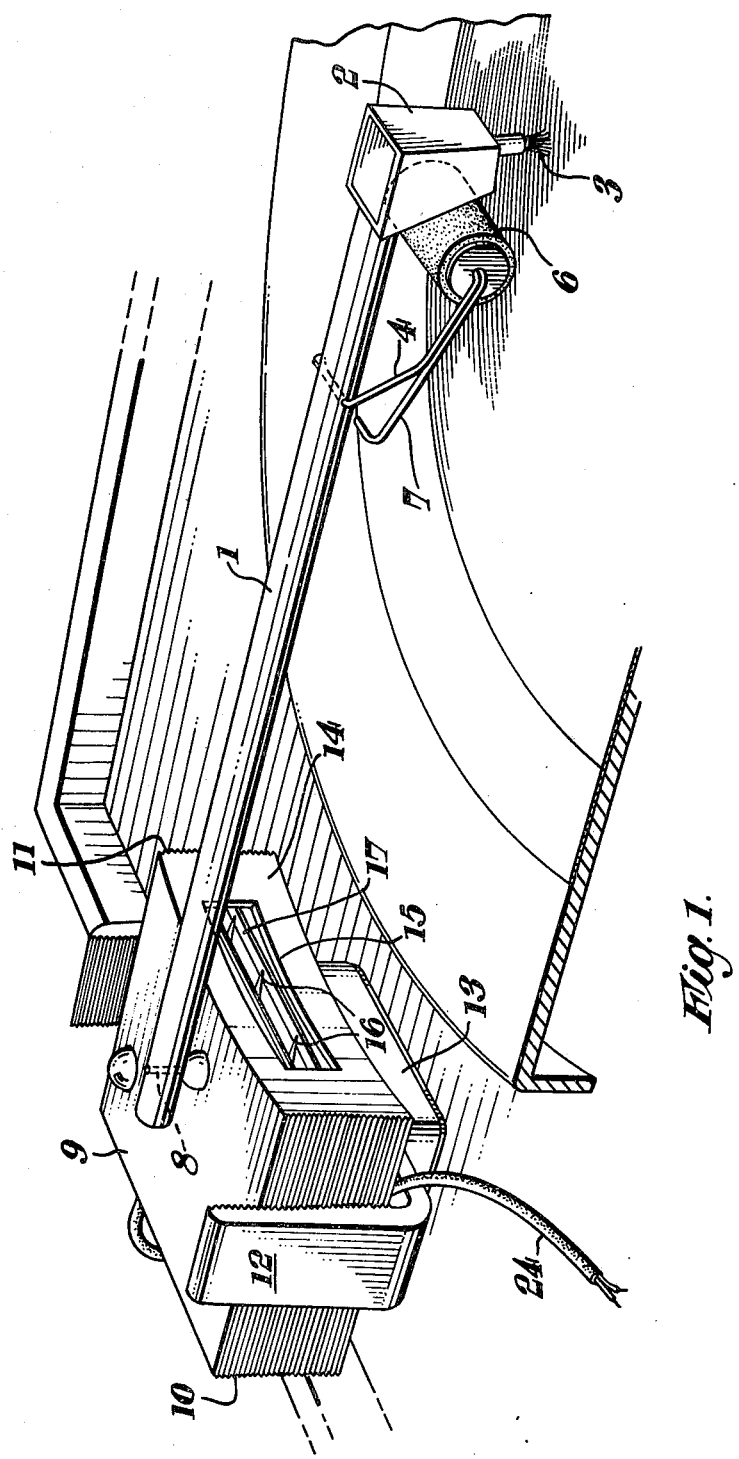

United States Patent [19]

English

[11] 4,139,201

[45] Feb. 13, 1979

[54] DUST REMOVING METHODS AND APPARATUS

[76] Inventor: Francis G. S. English, "Grinstead", King James's La., Henfield, Sussex, England

[21] Appl. No.: 837,316

[22] Filed: Sep. 28, 1977

[51] Int. Cl.$^2$ ............................................. G11B 3/58
[52] U.S. Cl. .................................. 274/47; 15/1.5 R; 361/212
[58] Field of Search .............. 361/212, 213; 15/1.5 R; 274/47

[56] References Cited

U.S. PATENT DOCUMENTS

| | | | |
|---|---|---|---|
| 2,576,399 | 11/1951 | Hicks | 361/231 |
| 2,991,331 | 7/1961 | Ross | 274/47 |
| 3,161,479 | 12/1964 | Biderman | 361/212 |
| 3,308,343 | 3/1967 | Smith et al. | 361/213 |
| 3,562,509 | 2/1971 | Kahl | 15/1.5 R |
| 3,822,065 | 7/1974 | Arbib | 274/47 |
| 3,945,647 | 3/1976 | Rangabe | 274/47 |
| 3,997,817 | 12/1976 | Secker | 361/213 |
| 4,083,073 | 4/1978 | Bernardini | 15/1.5 A |

FOREIGN PATENT DOCUMENTS

| | | | |
|---|---|---|---|
| 1240577 | 6/1959 | France | 274/47 |
| 917257 | 1/1963 | United Kingdom | 15/1.5 R |
| 381185 | 7/1973 | U.S.S.R. | 361/212 |

*Primary Examiner*—Richard E. Aegerter
*Assistant Examiner*—John W. Shepperd
*Attorney, Agent, or Firm*—Eyre, Mann, Lucas & Just

[57] ABSTRACT

The invention relates to methods and apparatus for removing dust from, or preventing dust from being attracted to, record discs. This is achieved by giving a negative charge to the dust particles in the atmosphere in which the record disc is located. Record discs are normally negatively-charged and, accordingly, negatively-charged dust particles are repelled by the record disc. The negative charge on the dust particles is produced by injecting negative ions into the atmosphere. Such negative ions may be produced by any suitable high-voltage generator with its positive pole earthed and its negative pole connected to one or more discharge electrodes. Preferably a brush is provided to disturb the dust in the grooves and a pad is provided to pick up the dust. Thus the record cleaner may consist of a pivotally-mounted arm carrying a brush and a pad, said arm being mounted on apparatus for producing negative air ions.

11 Claims, 4 Drawing Figures

DUST REMOVING METHODS AND APPARATUS

This invention relates to dust removing methods and apparatus and is particularly concerned with methods and appatus for removing dust from, or preventing dust being attracted to, record discs of the kind used for storing music or other audio-frequency information.

Such record discs normally consist of a synthetic resin material, which is liable to become negatively charged under the influence of friction. Such friction may occur both when attempts are made to remove dust from the grooves on the disc and also when the music or other audio-frequency information recorded thereon is being reproduced. The resulting negative charge attracts dust particles which settle in the grooves and interfere with the accurate reproduction of the recording and also are liable to cause damage both to the record disc and to the reproducing apparatus.

Accordingly, attempts have been made to remove the negative charge on a record disc or to prevent the accumulation of the charge thereon. One method that has been used is based on increasing the conductivity of the record surface by the application of moisture and another method is based on the cancellation of the negative charge by the application of a positive charge. Such methods have in the past not been entirely satisfactory and it is an object of the present invention to provide a more effective method and apparatus for preventing the dust from being attracted to the record disc.

From one aspect the invention consists in a method of removing dust from, or preventing dust from being attracted to, a record disc while the recording is being reproduced, wherein negative ions are introduced into the atmosphere in which the disc is located.

From another aspect the invention consists in record reproducing apparatus including means for introducing negative ions into the atmosphere in which the apparatus is located.

It is to be understood that the invention is based on a different concept from previous attempts to deal with the problem of dust accumulation in that it seeks to give a negative charge to the dust particles in the atmosphere in which the record disc is located. As a result of this negative charge, the dust particles are repelled by the negatively-charged record disc and are attracted to any earthed objects in the vicinity of the record reproducing apparatus.

The negative ions may be produced by any suitable high-voltage generator having its positive pole earthed and its negative pole connected to one or more discharge electrodes. Preferably, the electrodes should be shielded so that they cannot be accidentally touched, but the high-voltage generator used can have such a high internal resistance that it is unable to deliver sufficient current to cause a shock if the electrodes are touched. The high-voltage generator may, of course, be connected to the same mains supply as the electric motor and may be controlled by the same switching arrangements, if desired.

It has been shown that a negatively charged atmosphere can actually improve the environment from the medical point of view, while an atmosphere having an excess of positive ions is considered to be unsuitable from this point of view.

At the present time it is common practice to provide mechanical means for removing the dust from the grooves while the record is being played. Such means may consist, for example, of a brush and a pad mounted on a rotatable arm, which follows the grooves as the record is being played. The brush disturbs the dust in the grooves and the pad is intended to pick it up. This method is only partially successful at the present time because much of the dust is attracted back to the record by the negative charge thereon. However, if cleaning means of this kind are used in conjunction with apparatus in accordance with the present invention, the effectiveness of the cleaning means is greatly increased, since the pad tends to pick up substantially all of the dust which is now at the same electrostatic potential as the record.

Accordingly from yet another aspect the invention consists in a record cleaner including a pivotally-mounted arm carrying a brush and a pad, said arm being mounted on, or in the immediate vicinity of, air ionising apparatus.

Figure 2:
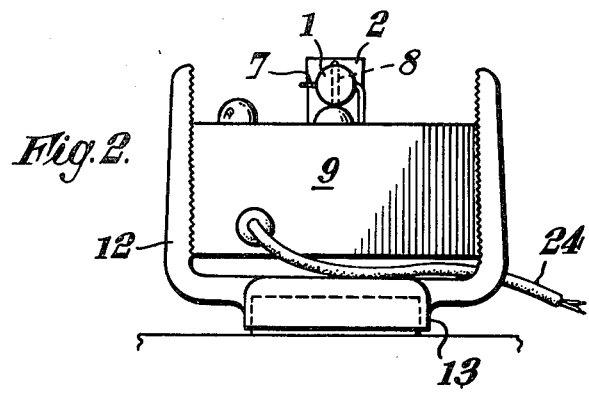
Figure 3:
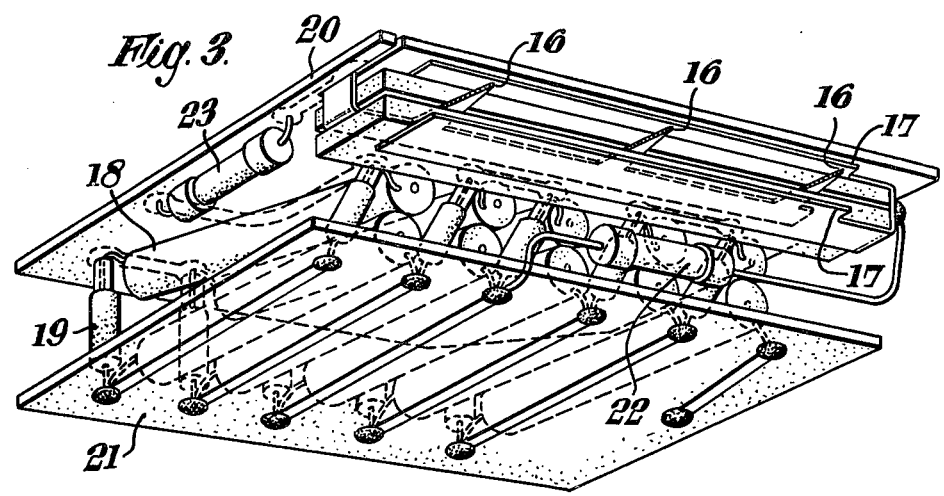
Figure 4:
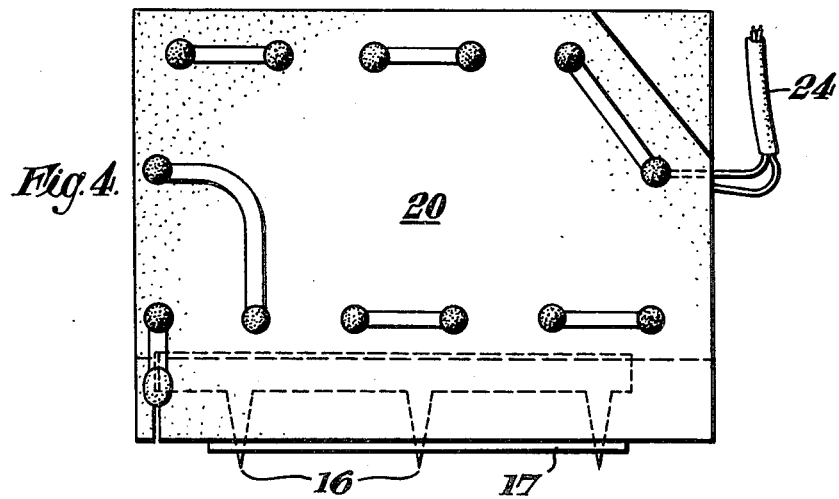

One method of performing the invention will now be described with reference to the accompanying diagrammatic drawings, in which:

FIG. 1 is a perspective view of a record cleaner in accordance with the invention in position in record-reproducing apparatus, FIG. 2 is a rear view of the record cleaner shown in FIG. 1, FIG. 3 is a perspective view of part of the record cleaner illustrated in FIGS. 1 and 2 removed from its housing, and FIG. 4 is a plan view of the part shown in FIG. 3.

The record cleaner illustrated includes an arm 1 having a head 2 in which is secured a brush 3. Pivotally-mounted on the arm 1, is a wire frame 4 carrying a cylindrical pad 6. The frame 4 includes a cranked arm 7 which limits the pivoting motion of the frame 4 relative to the arm 1. The arm 1 and the head 2 may consist of hard synthetic resin material and may be of generally-known construction except that it has been found desirable that the axis of the brush 3 should be almost perpendicular to the axis of the arm 1, whereas, in most known constructions of record cleaners of this general type, the brush is inclined forwardly relative to the arm 1.

The arm 1 is pivotally-mounted on a pin 8 which is upstanding from a housing 9 containing air ionising apparatus. This housing includes two parallel serrated sides 10 and 11 which are engaged by correspondingly serrated surfaces on the arms of a stirrup 12. The stirrup consists of resilient synthetic resin material, preferably a glass-filled polyester resin, and it will be seen that the housing 9 can be manually moved backwards and forwards parallel to the lines of the serrations with respect to the stirrup, and, by forcing the arms of the stirrup slightly apart, can also be raised and lowered with respect ot the stirrup.

The stirrup is provided with a hollow base 13 containing a magnet 14 preferably consisting of barium-ferrite. The magnet is preferably retained in the hollow base 13 by means of a potting resin.

Some record decks consist of a magnetic material and, accordingly, the stirrup 12 can normally be retained in any desired position on the deck by means of the magnet 14. However, if a record cleaner in accordance with the invention is used in conjunction with a record deck consisting of non-magnetic material, the base 13 may be secured to the deck by means of adhesive or alternatively a piece of steel foil may be secured to the deck with adhesive so that the base can be retained in position on the foil by means of the magnet. Since the housing 9 is adjustable within the stirrup 12, the exact position at which the base is secured to the deck is not particularly important. However, it should be ensured that the base is secured in such a position that the housing can be adjusted so that the brush can swing through an arc from the periphery of the turntable to a point located about 5 mm from the centre spindle of the turntable on a line between the spindle and the housing 9.

The front face 14 of the housing 9 is slightly concave and includes a slot 15. In this slot are located three pointed electrodes 16 and two strip electrodes 17. These electrodes form part of the air ionising apparatus and are connected to a voltage multiplier consisting of a plurality of capacitors 18 and rectifiers 19 mounted between a pair of printed circuit boards 20 and 21. The strip electrodes 17 are connected to a low-voltage negative terminal of the voltage multiplier through a protective resistor 22 and the point electrodes 16 are connected to the high-voltage negative terminal of the multiplier through a high-value protective resistor 23. The input of the voltage multiplier is connected to an alternating-current mains supply through a cable 24.

The terminal to which the strip electrodes 17 are connected may be at a d.c. potential of between 200 and 500 volts negative with respect to the neutral line of the mains supply, while the terminal to which the point electrodes 16 are connected may be at a potential of between 3 and 4 kV negative with respect to said neutral line. As a result of the high potential of the point electrodes 16, the air in the slot will be ionised. The positive ions produced will be attracted by the strip electrodes 17 and will be neutralised by them. The negative ions, on the other hand, will be repelled by the strip electrodes and will travel away from the slot in a direction generally perpendicular to the vertical plane of the slot.

When the apparatus is in use, the mains supply will be connected to the voltage multiplier and negative ions will be emitted from the slot. The pad 6 and the brush 3 will be placed on the record near the outer periphery thereof. While the record is being played, the negative ions will travel towards the pad and the brush and, as a result, dust picked up from the record will stay on the brush and the pad. Furthermore, any very fine dust in the base of the record grooves, which normally remains there causing wear and undesirable noise, will be picked up by the brush as a result of the presence of negative ions in the atmosphere surrounding the brush.

It has been found that the amount of dust removed from a record by a record cleaner in accordance with the invention with the air ionising apparatus in operation is at least 50% more than is removed without the air ionising apparatus operating.

As has already been pointed out, the housing 9 is adjustably mounted in the stirrup 12 and the height of the housing 9 is preferably set so that the central horizontal plane of the slot 15 is between 15 and 20 mm above the record. In these circumstances, if the proportions of the cleaner are substantially as shown in the drawings, it will be found that the arm 1 is substantially horizontal when the brush 3 is resting on the record.

The negative air ions will tend to charge the record as well as the brush and the pad, and it will be found that, after the record has been played several times with a record cleaner in accordance with the invention, the sleeve in which the record is kept will also acquire a negative charge. It has been found that this negative charge assists in keeping the record clean.

It is desirable after the record has been played to remove any dust adhering to the brush 3 and the pad 6. This can easily be done by rubbing the brush and the pad with the fingers.

It would be possible to operate a record cleaner in accordance with the invention using an ioniser which produces positive ions instead of negative ions. However, such an arrangement has a number of disadvantages. In particular, it is necessary to operate the ioniser at a higher voltage, for example 8 kV, in order to obtain a comparable effect and, in these circumstances, ozone is produced by the ioniser. In general, it is believed that ozone in large doses is harmful to health as also are positive air ions. In general, it has been found that a record cleaner producing negative air ions is two or three times as effective as a record cleaner emitting positive air ions.

In U.K. Pat. No. 1,330,309 there is claimed an aeroionizer which can be run from a battery or mains, operates with a high voltage produced by a voltage multiplier, and has a set of ionization electrodes and a deflecting electrode, wherein the set of ionization electrodes consists of a metal strip having a continuous portion from which project tip portions arranged in a saw tooth formation.

What is claimed is:

1. A record cleaner comprising an arm carrying a brush and a pad, an ionising apparatus operative to emit negative air ions, means for pivotally-mounting said arm on the ionising apparatus and means in said ionising apparatus for emitting negative air ions over said record in the direction generally parallel to the longitudinal axis of the arm said brush and pad being disposed on said arm in contact with the surface of said record whereby the combined action of said ions, brush and pad disturb, remove and hold dust from the surface of said record.

2. A record cleaner as claimed in claim 1, wherein said apparatus includes a plurality of pointed electrodes and at least one strip electrode.

3. A record cleaner as claimed in claim 2, wherein there are two parallel spaced strip electrodes, and wherein the pointed electrodes are arranged in a line midway between the two spaced strip electrodes.

4. A record cleaner as claimed in claim 3, wherein the ionising apparatus is contained in a housing having a generally rectangular opening in one face thereof, and wherein the air ions are emitted through said opening.

5. A record cleaner as claimed in claim 4, wherein said strip electrodes are parallel to the longer side of said opening and are recessed behind said opening within said housing while the points of said pointed electrodes project through said opening.

6. A record cleaner as claimed in claim 4, wherein said housing is adjustably mounted in a stirrup, and wherein said housing includes two parallel sides having serrated surfaces which cooperate with correspondingly serrated surfaces on the arms of the stirrup.

7. A record cleaner as claimed in claim 6, wherein the serrations on said arms of the stirrup are perpendicular to the axial extent of the arms, and wherein the serrations on said sides of said housing are parallel to the rectangular extent of said sides.

8. A record cleaner as claimed in claim 7, wherein the stirrup consists of resilient material so that said housing can be adjusted in a direction parallel to the lines of said serrations and, by manually forcing the arms of the stirrup apart, can also be adjusted in a direction perpendicular to said lines.

9. A record cleaner as claimed in claim 6, wherein said stirrup includes a hollow base containing a magnet.

10. A record cleaner as claimed in claim 7, wherein said ionising apparatus includes a voltage multiplier, wherein said pointed electrodes are connected to the negative output terminal of said voltage multiplier while said strip electrodes are connected to a terminal of said voltage multiplier having a negative voltage lower than that of said output terminal.

11. A record cleaner as claimed in claim 10, wherein said voltage multiplier includes a plurality of capacitors and rectifiers mounted between a pair of printed circuit boards, a high-value resistor being connected between the output terminal of said voltage multiplier and said strip electrodes.

* * * * *